March 26, 1957 R. V. WHITE 2,786,406
AUTOMOBILE EVAPORATOR COOLER
Filed Nov. 27, 1953
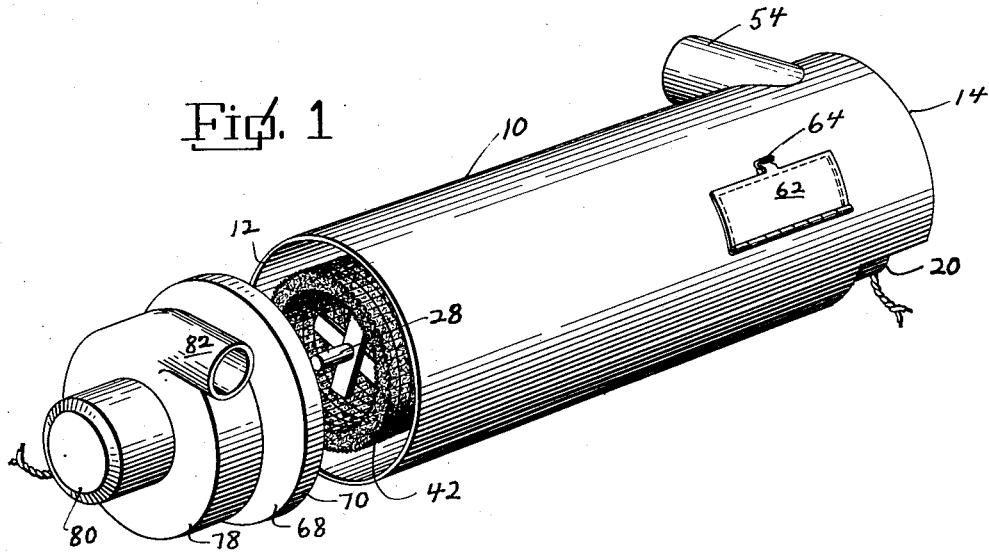
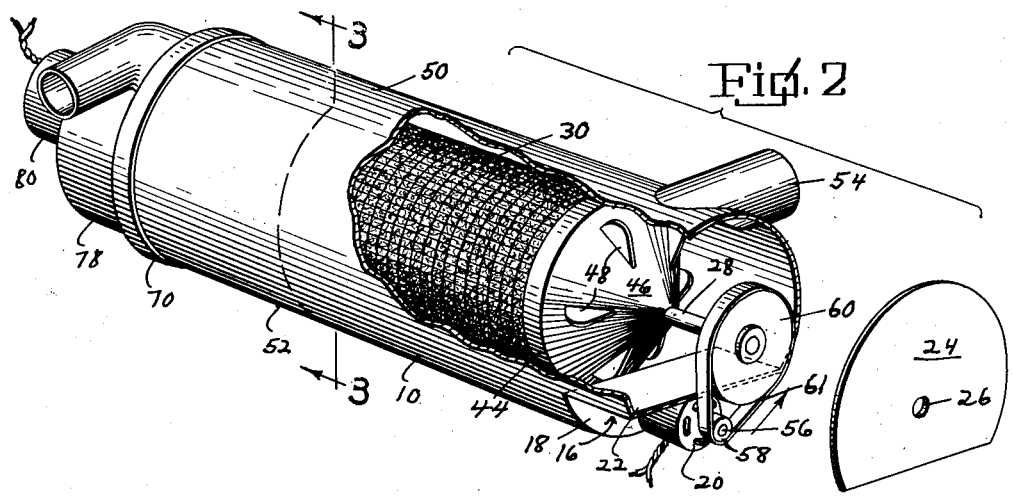
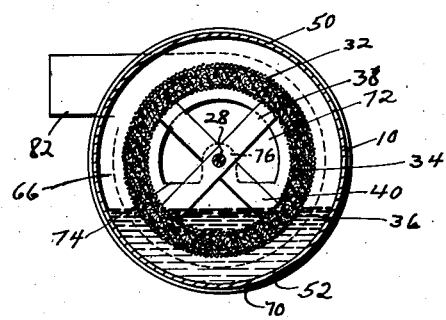

United States Patent Office 2,786,406
Patented Mar. 26, 1957

2,786,406

AUTOMOBILE EVAPORATOR COOLER

Rex V. White, Tulsa, Okla.

Application November 27, 1953, Serial No. 394,731

4 Claims. (Cl. 98—2)

This invention appertains to improvements in air coolers designed particularly, though not exclusively, for cooling the interior of a vehicle and relates specifically to a novelly constructed cooler which can be installed under the dashboard of an automobile and connected to the regular fresh air duct, which is provided as standard equipment in the recent models of the majority of automobiles.

A primary object of this invention is to provide a cooler which includes a rotating evaporator cylinder that is powered by the incoming air stream, as the automobile is being driven, and through which the air is forced to travel to the interior of the automobile, the cylinder rotating through a bath of liquid so as to be constantly saturated with such liquid as the air passes therethrough.

Another primary object of this invention is to provide means for positively rotating the cylinder, when the air stream lacks sufficient pressure to rotate it, as, for example, when the automobile is parked, and to provide means for drawing the air through the cylinder and exhausting it therefrom into the interior of the automobile.

A further object of this invention is to provide a cooler having a forced draft means to cause an air flow therethrough and to provide a cylindrical evaporator, which is rotated through a liquid bath, by the air stream, which passes radially through the evaporator to the inside thereof and then moves axially thereof to the forced draft means from whence it is exhausted to the interior of the automobile.

Another important object of this invention is to provide a compact evaporator cooler for a vehicle which, when the vehicle is in motion, will be run entirely by the air stream coming into the vehicle by way of the standard fresh air inlet duct, and which, when the vehicle is stopped for a long period, can be run by small power means, that will consume little energy from the battery.

These and ancillary objects, including the provision of a compact, sturdy and easily positioned cooler, are attained by this invention, the preferred embodiment of which is set forth in the following description, wherein:

Figure 1 is a perspective view of the cooler with the fan end, shown removed therefrom in axial spacement for illustrative purposes in showing the interior construction of the cooler;

Figure 2 is a perspective view of the cooler, a portion of the casing being broken away to show the interior construction and, for this reason, with the end wall shown removed and spaced therefrom, and Figure 3 is a cross sectional view taken on line 3—3 of Figure 2.

Referring now more particularly to the accompanying drawing, the cooler includes a cylindrical casing 10 which has an open end 12 and a closed end 14. The closed end is set in at its lower circumferential section as at 16, and the inset end wall portion 18 of the end 14 provides a support for a small motor 20, which underlies the flat bottom 22 of the upper projecting portion of the end. The end wall 24 of such upper portion has an opening 26 within which one end of a shaft 28 is journalled.

The shaft 28 supports an evaporator unit 30, which is composed of concentric, radially spaced inner and outer cylindrical screens 32 and 34, between which is interposed an absorbing cylinder 36 of shredded aspen wood. The cylinder 36, which absorbs moisture, is held between the screens and forms the evaporator proper of the evaporator unit. Crossed supporting bars 38 and 40 are fixed at their crossed center sections on the shaft, and mount one end of the evaporator unit in spaced fashion on the shaft. Such end 42 is open, as shown in Figure 1.

The opposite end of the unit 30 fits into the peripheral annular flange 44 of a cone 46. The minor end of the cone is formed with an opening that fixedly receives the shaft. The cone 46 serves to close off the end of the unit and to mount the end in spaced fashion on the shaft. In addition, the outer surface of the cone is provided with circumferentially spaced, radial fins 48, that are in circular alignment, and function to rotate the unit 30 under the pressure of air entering the casing.

In this respect, the casing 10 is adapted to be mounted in any suitable fashion and within a suitable mounting bracket under the dashboard of an automobile (not shown) so that the casing is positioned transverse to the longitudinal axis of the automobile. In such position, the casing will have a front section 50 and a rear section 52, with respect to the forward movement of the automobile. The front section 50 is provided adjacent the top of the casing with an air intake pipe 54, that is integral with the casing and is adapted to be connected to the regular or standard fresh air duct which is standard equipment on the late models of the majority of automobiles. Thus, the casing receives the air from the standard fresh air duct, the air entering the casing substantially tangentially and the pipe 54 being disposed on a tangent to the circle in which the fins are disposed whereby the air impinges on the fins to provide the propulsion force for effecting rotation of the evaporator unit 30.

In the event that the air stream, entering the casing through the pipe 54, is not of sufficient pressure to produce a rotation of the evaporator unit 30, the motor 20 is drivingly connected to the shaft 28 to positively rotate the shaft and the evaporator unit, under certain conditions of speed of the automobile and also temperature features. The armature shaft 56 of the motor 20 is provided with a small roller 58 over which a belt 61 is disposed, the belt traveling over a large roller or pulley 60 which is fixed on the shaft 28.

The front section 52 of the casing is provided with an opening that is closed by a trap door 62, provided with a suitable friction fastener 64 to keep it in its closed position. The purpose of the trap door is to provide admission to the interior of the casing for filling the casing with water.

Water is poured into the casing through the opening until it reaches the approximate level shown in Figure 3. As shown therein, the lower portion of the evaporator unit will be constantly immersed in the water bath and, as the unit is rotated, the absorbing cylinder 36 will be completely saturated with water. The cylindrical evaporator unit 30 is radially spaced inwardly from the inner surface of the casing so that an annular space 66 concentrically surrounds the unit 30. The air, entering in a stream through the air intake pipe 54, after it impinges on the fins will swirl around the evaporator unit through the space 66 and radially penetrate the cylindrical unit 30, causing the water to be evaporated and the air to be cooled. The air will flow axially from the inner bore of the cylindrical unit 30 through the end 42 thereof. The open end 12 of the casing is closed by a water-tight cap 68, the flange 70 of which fits tightly on the end of the casing. The cap has an arcuate cut-out 72, through which the air passes from the casing. The straight wall 74 of the cut-out lies above the level of the water bath and is provided with an upstanding apertured ear 76 to journal the end of the shaft 28. A squirrel cage fan 78 is carried by the cap 68, along with a fan motor 80 for driving the centrifugal fan within its casing which is integral with the cap. The tangential exhaust pipe 82 of the fan is disposed rearwardly and acts in an opposite direction to the air intake pipe 54 so that the air is directed to the interior of the automobile toward the rear thereof.

In use, when the automobile is in travel, the movement of the automobile will cause air to enter the standard fresh air duct and pipe through the air intake pipe 54 to the interior of the casing 10. The air stream will impinge on the fins 48 and produce a rotation of the cylindrical evaporator unit 30 through the water bath. The air will continue around the cylindrical evaporator unit 30 and will flow through the fibrous walls of the moistened absorbing cylinder 36 into the inner bore thereof and then pass out through the arcuate opening 72 and through the fan 78 into the interior of the automobile.

In the event that the air entering the casing through the air intake pipe 54 is not of sufficient volume or pressure to produce a rotation of the evaporator unit 30, the small motor 20 is put in operation through a suitable switched circuit from the battery, to rotate the drum or pulley 60. Of course, when the motor 20 is not in operation and the evaporator unit 30 is rotated under the force of the incoming air stream, the driving motor will just coast in its off position.

When the automobile is not in motion, the squirrel cage fan 78 can be put in operation, by energizing the motor 80 through a suitable switched circuit with the battery. The fan 78 will provide a forced draft and will draw the fresh air through the fresh air duct and air intake pipe 54 and through the casing 10 in the manner described above in connection with the naturally moving air stream.

Thus, either one or both of the motors 20 and 80 may be put in operation, one at a time or both at the same time, depending upon certain conditions of speed of the automobile and, of course, the temperature of the interior of the automobile.

While the best known form of this invention has been illustrated in the accompanying drawing and described in the foregoing, other forms may be realized so that limitation is sought only in accordance with the appended claims.

I claim:
1. For use with an automobile having a fresh air duct leading to the interior thereof; an evaporator air cooler comprising a cylindrical casing adapted to be horizontally disposed in the interior of an automobile and having a closed end and an open end, an air inlet pipe laterally carried by the casing and disposed substantially tangentially thereto, the casing being adapted to contain a water bath in its lower portion, a water tight cap fitted on the open end of the casing and having a wall closing off the open end and formed with a cut-out above the level of the water bath, a shaft disposed axially in the casing and rotatably mounted in the closed end of the casing and the wall of the cap below the cut-out, a cylindrical absorbent member fixedly mounted on the shaft and spaced radially therefrom and from the inner surface of the casing, said member having open ends, one of which is immediately adjacent the cap and from which air discharges axially through the cut-out, a closure closing off the opposite end of the member and mounting the member on the shaft, fins radially projecting from the closure and disposed in circular alignment, said air inlet being disposed adjacent the closure and being directed on a tangent toward the circle in which the fins are arranged so that air entering the casing from the air inlet pipe impinges against the fins to rotate the member, the air then passing between the casing and member and radially through the member to the interior thereof.

2. An evaporator air cooler as claimed in claim 1, wherein a selectively operable motor is carried by the casing, and a drive connection is provided between the motor and the shaft for rotating the member when the pressure of the incoming air stream is insufficient to produce a rotative movement thereof.

3. An evaporator air cooler as claimed in claim 1, wherein a fan unit is carried by the cap and is selectively operable to draw the air from the duct through the casing and pass it to the interior of the automobile.

4. An evaporator air cooler as claimed in claim 1, wherein a fan unit is carried by the cap and is selectively operable to draw the air from the duct through the casing and pass it to the interior of the automobile, said fan having a discharge pipe extending in an opposite direction to the air inlet pipe.

References Cited in the file of this patent
UNITED STATES PATENTS

| | | |
|---|---|---|
| 2,431,146 | Steele | Nov. 18, 1947 |
| 2,516,103 | Brown | July 25, 1950 |
| 2,631,023 | Bailey | Mar. 10, 1953 |
| 2,634,112 | Snow | Apr. 7, 1953 |
| 2,648,272 | Norton | Aug. 11, 1953 |
| 2,657,026 | Richter | Oct. 27, 1953 |
| 2,657,027 | Marion | Oct. 27, 1953 |
| 2,673,079 | Plunk | Mar. 23, 1954 |